（12）United States Patent
Greenawalt et al.

(10) Patent No.: US 7,891,001 B1
(45) Date of Patent: Feb. 15, 2011

(54) METHODS AND APPARATUS PROVIDING SECURITY WITHIN A NETWORK

(75) Inventors: Andrew Ivar Greenawalt, Monroe, CT (US); Joel Michael Nimety, Westport, CT (US); Ronald Charles Fritz, II, Ravenna, MI (US)

(73) Assignee: Perimeter Internetworking Corporation, Milford, CT (US)

( * ) Notice: Subject to any disclaimer, the term of this patent is extended or adjusted under 35 U.S.C. 154(b) by 1369 days.

(21) Appl. No.: 11/213,460

(22) Filed: Aug. 26, 2005

(51) Int. Cl.
G06F 12/14 (2006.01)
G08B 23/00 (2006.01)
H04L 29/06 (2006.01)

(52) U.S. Cl. ............... 726/22; 726/23; 726/24; 713/151; 713/153; 713/154

(58) Field of Classification Search ............... None
See application file for complete search history.

(56) References Cited

U.S. PATENT DOCUMENTS

2007/0039053 A1* 2/2007 Dvir ............... 726/24

* cited by examiner

*Primary Examiner*—Kaveh Abrishamkar
(74) *Attorney, Agent, or Firm*—Chapin IP Law, LLC

(57) ABSTRACT

An in-network security provider applies security event identification, analysis and processing to a customer's data communications traffic in the form of a "security in the cloud" solution. This method of network defense is achieved when customers pass all of their outbound data communications traffic through the security provider before that data communications traffic reaches the public Internet. Additionally, all inbound data communications traffic is passed through the security provider before it is delivered to the customer. The security provider receives the inbound and outbound sequence of data packets and segregates the sequence of data packets into respective packet flows based on data packet types (HTML, SMTP, FTP, etc.). For individual respective packet flows, the system applies security processing that is appropriate to those packet flows based on that packet flow's data packet type.

23 Claims, 7 Drawing Sheets

METHODS AND APPARATUS PROVIDING SECURITY WITHIN A NETWORK

BACKGROUND

Computer systems, networks and data centers are constantly exposed to an ever evolving variety of attacks that attempt to identify and expose vulnerabilities of such systems in order to compromise their security and operation. As an example, various forms of malicious software program attacks including but not limited to viruses, worms, Trojans and the like are obtained within data communications received over a network such as the Internet. Once resident within a computer, a malicious program that executes can disrupt operation of the computer to a point of inoperability and/or might spread itself to other computers within a network or data center by exploiting vulnerabilities of the computer's operating system or resident application programs. Additionally, once resident within a computer, a malicious program can spread itself to other computers within a network or data center through legitimate network communication means.

Other malicious programs might be received by and operate within a computer to secretly extract and transmit information within the computer to remote computer systems for various purposes. As an example, spyware is a form of software that can execute in the background (e.g., unbeknownst to users) of a computer system and can track, record and transmit user input to the computer system to remote computer systems. Spyware can silently obtain information such as usernames and passwords required to access protected data, lists and contents of files or remote web sites accessed by the user, and so forth. Using such information, spyware can access and transmit confidential information from a business or other entity to a recipient for use in malicious purposes.

Computer system developers, software developers and security experts have created many types of conventional preventive measures that operate within conventional computer systems and networks to prevent operation of malicious programs from stealing information or from compromising proper operation of the computer systems and/or networks. As an example, conventional virus detection software operates to monitor incoming data received by a computer system, such as electronic mail messages containing attachments, to identify viruses that might be present within the data accessed by the computer. Conventional data communications devices such as firewalls can be equipped to automatically obtain up-to-date virus and spyware definitions and are able to scan incoming and outgoing data packets in an attempt to identify data transmissions that contain known viruses or spyware. Upon detection of inbound data containing a virus, spyware or another malicious program, the virus detection software operating in the firewall device can quarantine the inbound data so that computer systems in a network protected by the firewall did not become contaminated.

Other examples of conventional malicious attacks, intrusions, or undesirable processing that can cause problems within computer systems or even entire computer networks include but is not limited to reception of unwanted electronic mail (i.e. spam or junk mail), worm attacks, Trojan horse attacks, denial-of-service attacks, execution of malicious mobile code, and rogue employees who steal corporate data using networks as a transport mechanism. These data security threats constantly evolve and new threats appear on an almost daily basis. Virus attacks, worm attacks, and Trojan horse attacks are variants of each other that generally involve the execution of a program in a computer, for which a user often is unaware of its existence, that performs undesired processing operations to compromise the computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Buffer overflow attacks occur when programs, typically obtained by a user over a network such as the Internet, do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within data communications devices such as firewalls or gateways installed in an organization's network between different portions of networked computer systems (e.g. as an entry point to that organizations network on the Internet) in order to halt propagation of malicious programs to the organization's local area network (LAN) or other sub-networks.

Another security threat to modern computer systems is inside user-based attacks. These are often the most difficult to prevent and involve a malicious user such as an employee within an organization who intentionally does damage to the organization by transmitting information from that organization to a competitor. A user can use a common tool such as electronic mail to transmit vital information from a company that can adversely affect the business of that company.

SUMMARY

Security threats are growing at an exponential rate and so is the number of security technologies designed to address these new threats. Conventional mechanisms and techniques for protecting networks from these security threats suffer from a variety of deficiencies. These deficiencies begin with the fact that these conventional security solutions are technology focused solutions and require devices such as firewalls and intrusion detection systems, to physically reside on the protected network. For those businesses that operate multiple facilities located in numerous disparate geographical regions on a network such as the Internet, conventional data communications security preventive measures must be located within each separate network facility that the corporation desires to protect.

This technology focus and location requirement is the primary driver for conventional security solutions' inability to scale and effectively defend against ever-changing security threats. Why? Because protecting networks from security threats is not a problem that technology can solve. Effective security certainly has a technological component, but network security is a business problem, and the only way to fix it is to recognize it as such.

Businesses that require maximum data communications security, such as financial institutions (e.g., banks, securities trading companies or the like), typically do not have the budgets available to "future proof" their network because the costs are significant and constant. The traditional security approach requires Information Technology (IT) managers to research, justify, acquire, install and maintain multiple security technologies within each corporate facility. In most cases, the technologies deployed is not the best possible solution available but rather the solution that fits within the approved budget. Additionally, these security installations are only as good as the current implementation and since most companies are not focused on security, the system becomes less than fully effective in a short amount of time as security threats constantly evolve and become more sophisticated. As a result, locally managed security solutions create a never ending process of trying to keep up with the current set of security threats and IT security managers using conventional solutions have difficulty with this task.

In contrast, embodiments of the invention implement an evolving security platform conceptually referred to as "security in the cloud". This network security delivery model provides an evolving, best of breed network security infrastructure housed at a provider facility located within a network such as the Internet, without the need for client premise equipment. The security in the cloud model provided by the system of the invention provides the highest level of protection, scalability and flexibility for data communications transmitted to and from computer systems by connecting security customers such as businesses through a security provider infrastructure without requiring capital expenditure or complicated and expensive systems integration projects within that security customer's facility and therefore replacing legacy on-site devices such as Firewalls, Intrusion Detection Systems and other security technologies with the most advanced learning and adaptive security infrastructure available.

The security provider model explained herein provides a subscription based, pre-integrated security architecture that significantly reduces the time and work required to address pressing security issues for customers without integration risk or headaches to those customers.

An in-network security provider applies security event identification, analysis and processing to a customer's data communications traffic in the form of a "security in the cloud" solution. This method of network defense is achieved when customers pass all of their outbound data communications traffic through the security provider before that data communications traffic reaches the public Internet. Additionally, all inbound data communications traffic is passed through the security provider before it is delivered to the customer. The security provider receives the inbound and outbound sequence of data packets and segregating the sequence of data packets into respective packet flows based on data packet types (HTML, SMTP, FTP, etc.). For individual respective packet flows, the system applies security processing that is appropriate to those packet flows based on that packet flow's data packet type.

The system receives a respective custom selection of security processing to be applied to different types of data communications traffic for each security customer and stores this in a security profile specific to each customer. Security processing applied to data communications traffic of one security customer can be custom selected by that one customer and stored in a security profile that is different than a security profile specifying different security processing applied to similar data communications traffic of another security customer.

From the customer's perspective, this is a "no assembly required" solution which provides customers with an ever-evolving data communications security management solution in a scalable, flexible, and cost effective manner.

Using the system disclosed herein, from the security customers perspective they are provided with full Internet connectivity and functionality that has been "cleaned and processed" by the most sophisticated security infrastructure available. The entire process is a "no assembly required" solution that delivers an adaptive security platform that is continuously equipped with new features and security processing capabilities as new threats arise. The security provider is centralized and operates on behalf of many customers and as new security threats emerge, the system can be quickly updated once with new security technologies to combat the new threat. This capability provides security customers with "security on demand," without requiring expense, upgrade or modification of customer premise equipment. This approach increases the effectiveness and efficiency of security operations. The system provides secure network services for important types of data communications such as those used by financial institutions, corporations, or any other type of organization with high data security and/or regulatory requirements. Examples of managed security services and processing include Intrusion Defense, Malicious Code Defense, Secure Mail Services, Secure Access, Automated Compliance and Secure Network Services.

Organizations requiring maximum levels of data communications security might require far more security mechanisms than conventional network based security solutions such as firewalls alone can provide. This is because conventional devices such as firewalls are limited in the number of different types of security threats they can defend against. As an example, a conventional firewall cannot perform robust electronic mail checking beyond virus and spam checking, as well as World Wide Web and file transfer traffic security processing, and security processing on many other protocols. Embodiments of the invention are based in part on the observation that different types of data communications traffic each require different types of security processing. To provide this, the security provider of this invention provides in-network security customer subscription-based security mechanisms and techniques for applying security processing to data communications traffic. Generally, the security provider operates to receive a sequence of data packets for a number of different security customers and segregates the sequence of data packets into respective packet flows based on data packet types. For example, electronic mail traffic (SMTP), World Wide Web traffic (HTTP), file transfer traffic (FTP), third party applications traffic and so forth are each separated into distinct data packet flows. For individual respective packet flows, the security provider applies security processing that is appropriate to those packet flows based on each packet flow's data packet type. This allows data-type-specific security processing to be provided without trying to have a single firewall perform all security processing or by having multiple customer premise technologies deployed to perform the security processing.

The security provider receives and stores a custom selection of security processing for each security customer in a security profile specific to that customer, such that security processing applied to data communications traffic of one security customer can be custom selected by that one customer and stored in a security profile that is different than a security profile specifying different security processing applied to similar data communications traffic of another security customer. In one configuration, the security provider segregates the sequence of data packets into respective packets flows based on data packet types by inspecting contents of individual data packets within the sequence of packets to provide a traffic classification of each individual data packet into one of a plurality of different data packet flows. Based on the traffic classification of each individual data packet into a specific data packet flow, the system directs the individual data packets of each respective data packet flow for each traffic classification to a set or one or more respective security processing nodes that apply specific security processing that is appropriate for the traffic classification associated with that data packet flow. In this manner, individual security processing nodes can each perform specific security testing on packets and as each test passes, the packet can be processed by the next node, until all subscribed-to testing on that traffic type is complete.

Data traffic is divided based on traffic type and processed in this manner for each of a plurality of security customers, the security provider performs a respective security profile lookup to obtain the security profile for that customer that identifies specific security processing services that the security customer subscribes to from the security provider for application to individual data packet flows associated with that security customer. Since each security customer has a particular security profile indicating what types of testing are to be performed on what types of data traffic, each customer is provided with security specific to that customer's needs. As an example, for a traffic type such as electronic mail, each customer can choose from and subscribe to traffic specific security processing that can include virus checking, electronic mail spam filtering, user validation of at least one of a sender and a recipient of an electronic mail message associated with the security customer, black hole validation, content leakage detection to detect unauthorized transmission of content to and from the security customer within electronic mail, electronic mail encryption and decryption operations and others. For World Wide Web traffic security processing, each customer can choose to subscribe to security processing that includes, for example, virus checking, content filtering, uniform resource locator information validation, World Wide Web protocol validation and so forth. For many other different types of traffic, customers can selectively choose other security processing as well. All data communications traffic for each customer is routed to the security provider before entering or exiting the customer network via establishment of a secure default route for that customer's data traffic such as a frame relay connection, a virtual private network, etc. In this manner, customers do not have to modify their own premises equipment. Moreover, since the system is implemented within a centralized facility, adding new security processing features only requires modification at the security provider facility, and can benefit each customer that subscribes to the new security processing. For the customer, adding additional security processing capabilities due to new regulatory requirements or increased security threat, is seamless and requires no capital expenditure for hardware or software.

Other embodiments of the invention include any type of computerized device, workstation, data communications device, or the like configured with software and/or circuitry (e.g., a processor) to process any or all of the method operations disclosed herein. In other words, a computerized device or a processor that is programmed or configured to operate as explained herein is considered an embodiment of the invention. The architecture of the system disclosed herein can be implemented in a platform having a variety of different configurations. In a simple implementation, a single computer system provides software processing to perform all operations explained herein. In an alternative configuration, several separate devices coupled together provide the collective security processing explained herein. As an example, one or more content-aware networking switches such as Layer 4 networking switches can be programmed to recognize and segregate customer traffic to which security is to be applied into different traffic types of data communications traffic based on traffic type. The switches (or routers) can then route the traffic based on type to individual security processing nodes that apply security processing specific to that type of traffic. The specific nodes to which the traffic is routed can depend upon the types of security processing that each customer subscribes-to. Each security processing node can be a server, such as a rack mounted blade server, and a session manager in one server can control the routing of each packet between different nodes for each security processing test that is to be applied to that traffic for that customer as specified in that customer's security profile. In this manner, the system architecture is scalable to any number of customers since additional security processing nodes can be added as customer and traffic loads increase.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Perimeter Internetworking Corporation, Inc. of Milford, Conn., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
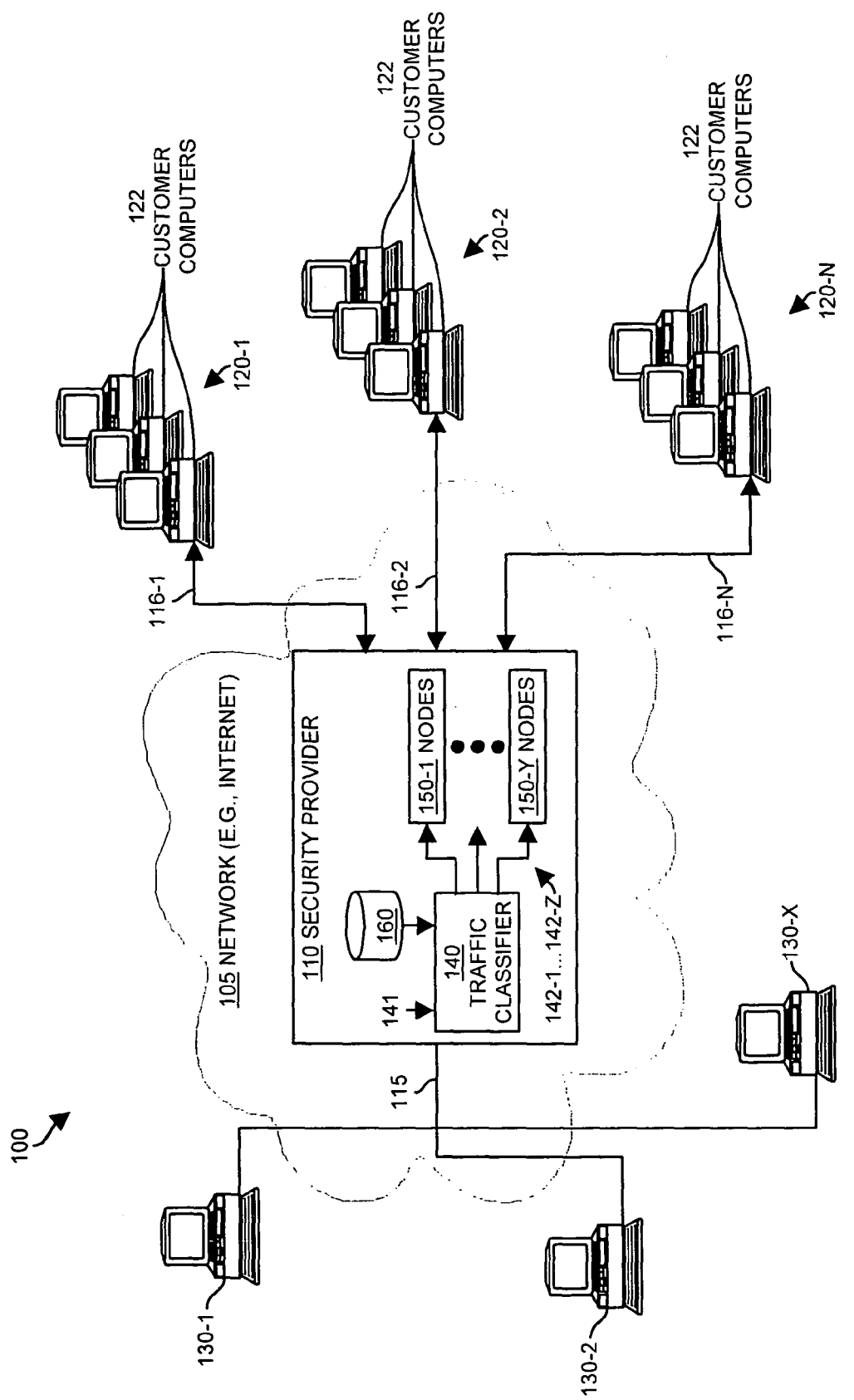
FIG. 1 illustrates an example configuration of a network environment that includes a security provider configured as disclosed herein.

FIG. 1 illustrates a network environment 100 suitable for use in explaining example embodiments of the invention. The networking environment 100 includes a computer network 101 such as the Internet that supports the exchange of data between various computer systems 130-1 through 130-X, a security provider 110, and a plurality of security customer facilities 120-1 through 120-N. In the illustrated configuration, the security provider 110 operates as explained herein to provide subscribed-to security processing services on behalf of computer systems 122 operated within the security customer facilities 120-1 through 120-N for data communications exchanged with the other computer systems 130-1 through 130-X within the network 101.

The security customer 120 may include any type or number of computer systems 122 which may be configured, for example, within one or more local area networks. The collections of computer systems 122 are each generally referred to herein as respective security customers 120. Each security customer 120 may operate computer systems 122 that are distributed within multiple facilities located in different areas of the network 101. As an example, the security customers 120 may represent various organizations such as corporations that require high levels of network security with respect to data communications exchanged with those organization's computer systems 122. A specific example is a bank or other financial institution that requires a very high-level of security processing to be applied to any data communications transmitted to or from the bank or financial institution computer systems 122. The other computer systems 130 represent, for example, any other organizations such as other businesses, government entities or the like with which the security customers 120 require their computer systems 122 to communicate. Continuing the bank or financial institution example, such organizations often require the ability to perform data communications with other businesses or money management organizations such as other banks, trading companies, stock markets, the U.S. Federal Reserve, foreign markets, or the like. The security provider 110 configured as disclosed herein provides such security processing within the network 101 on behalf of the security customers 120 and allows each security customer 120 to selectively choose and subscribe-to various types of data communications security offered by the security provider 110 for different types of data communications traffic.

In particular, embodiments of the invention are based in part on the observation that there are many different types of data communications traffic, such as electronic mail, World Wide Web traffic, file transfer communications, XML-based communications, third party applications traffic, remote access traffic and so forth. Each type of data communications traffic has unique characteristics with respect to types of security processing that can be applied to that traffic in order to provide a high-level of trust and security for data transfers of that traffic type. In other words, each of these different types of data communications traffic is susceptible to various vulnerabilities and security issues and therefore requires specific security processing to be applied to that type of data traffic that is distinct or different from security processing that might be applied to another type of data communications traffic. As an example, electronic mail data communications traffic exposes security customer computer systems 122 to a variety of vulnerabilities that might be different, for example, than security threats posed by World Wide Web or file transfer data communications traffic. Likewise, many other types of traffic such as file transfer traffic, XML-based traffic, third party application traffic and so forth may each use different applications and data communications protocols during communications and each may be exposed in various different ways to diverse security vulnerabilities.

The security provider 110 as disclosed herein provides a flexible and highly scalable security processing architecture that can apply custom selected security services to customer traffic on a customer-by-customer basis and on a traffic-type basis for each customer. As a brief example, using the system disclosed herein, one customer 120 might subscribe to electronic mail security that includes application, by the security provider 110, of virus checking, spam filtering, and sender and recipient electronic mail name validation security processing to that customer's electronic mail traffic, while another customer might subscribe to electronic mail security processing that includes virus checking, spam filtering, content filtering and encryption security processing.

To accomplish this, the security provider 110 includes a collection of one of more integrated devices, such as data communications devices and/or computer systems that include, in this example, a set of security profiles 160, a traffic classifier 140 and sets of security processing nodes 150-1 through 150-Y.

In this example configuration, the traffic classifier 140, that may be either one or more hardware devices such as a Layer 4 network switch capable of content routing, or the traffic classifier may be a software process operating in one or more computer systems. The traffic classifier 140 is operable to receive data communications 141 as a sequence of packets 141 destined to or from any security customer computer systems 122. The traffic classifier 140 can segregate, classify or otherwise categorize this sequence of data packets 141 based on the type of communications being transported within individual data packets and/or based on source or destination addresses in such packets 141, or based on other information, data content, protocol fields or other such information in those packets (or any combination thereof). Once classified, the classifier 140 can direct each packet flow corresponding to a specific traffic type, such as electronic mail traffic, World Wide Web traffic, file transfer traffic, and so forth to a specific respective set of security processing nodes 150-1 designed as explained herein to apply security processing specific to that data packet flow, based on the type of traffic for that flow. Thus a first set of security processing nodes 150-1 might apply electronic mail specific security processing to customer electronic mail traffic flows 142-1 segregated by the traffic classifier 140, whereas a second set of security processing nodes 150-2 might apply World Wide Web specific security processing to customer web traffic packet flows 142-2 segregated by the traffic classifier 140, and so forth.

The security provider 110 maintains a set of security profiles 160 specific to each customer 120, and each customer 120 can selectively subscribe-to (or unsubscribe-to) various types of security processing that can be selectively applied to each type of data traffic flow 142 processed by the security provider 110. The security profile for each customer indicates what services each customer subscribes-to and thus indicates what processing is to be applied to that customer's data communications traffic. As an example, a security profile 160-1 for a security customer 120-1 may indicate that the customer 120-1 has subscribed to electronic mail security including spam control, virus checking, encryption and sender and recipient verification to all traffic 141-1 to and from that customer 120-1 (or just to, and maybe not from, depending upon the specifics of the subscription as specified in the security profile 160-1 for that customer 120-1), whereas a security profile 160-N for another customer 120-N might indicate that only spam control and virus checking are to be applied to that customers 120-N electronic mail traffic 142-1.

Figure 2:
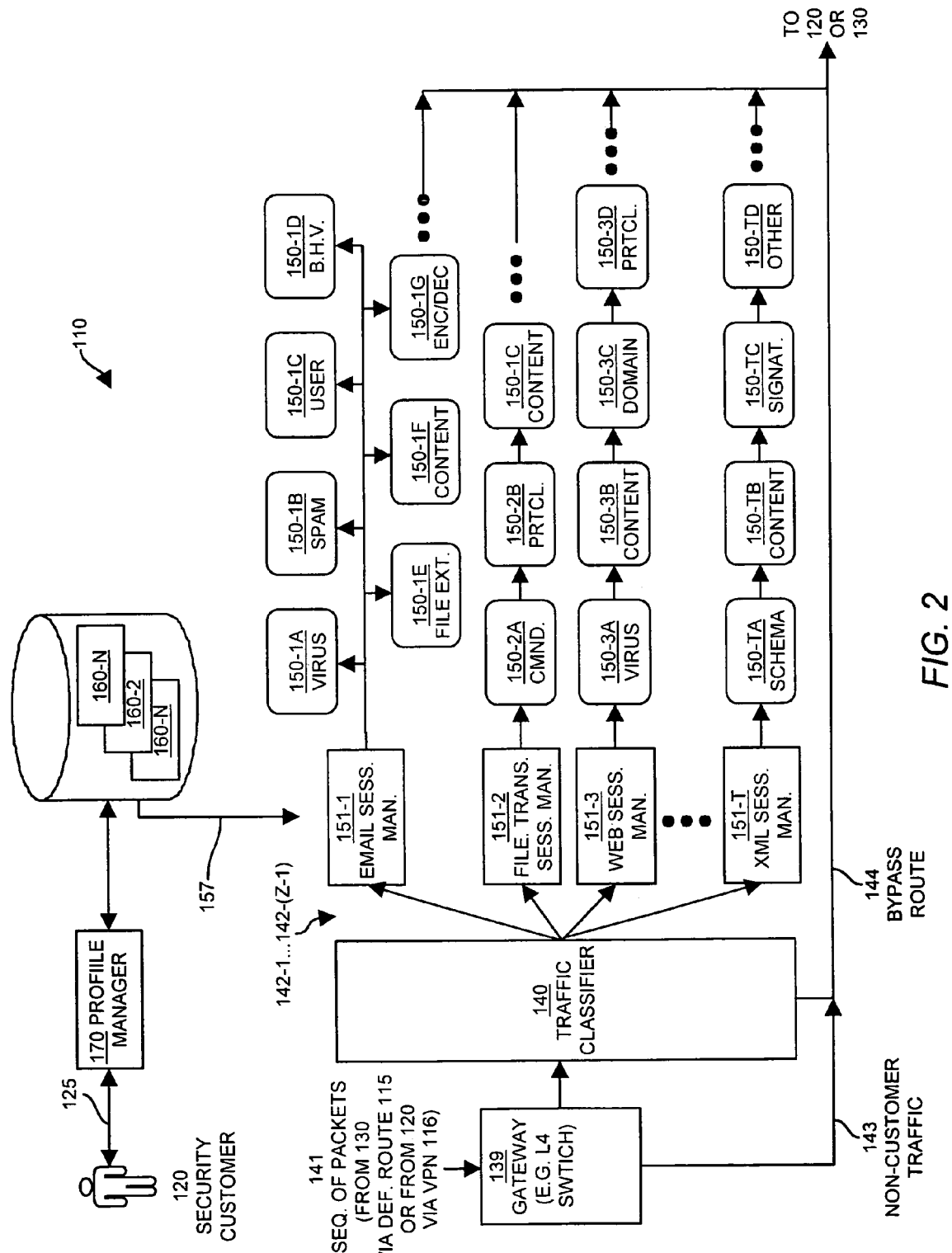
FIG. 2 illustrates a more detailed architecture of the security provider configured with a security system in accordance with one example configuration.

FIG. 2 is a more detailed illustration of architecture of a security provider 110 in accordance with one example about the invention. In this example, the set of security processing nodes include security processing nodes 150 for specific security processing related to the individual traffic flows 142. In particular, the set of security processing nodes 150-1 applies security processing specific to electronic mail traffic, the set of security processing nodes 150-2 applies security processing specific to file transfer traffic (such as packets sent using the File Transfer Protocol (FTP), Network File System (NFS) protocol, or the like), the set of security processing nodes 150-3 applies security processing specific to World Wide Web traffic (e.g., transferred using HTTP on TCP port 80 or HTTPS on TCP port 443), while the set of security processing nodes 150-Y applies security processing specific to markup language traffic such as XML traffic. Other types traffic to which security processing can be applied include various types of real-time and non-real-time traffic such as Voice over IP (VOIP), telnet or other remote access traffic, custom or application specific protocol traffic, and the like. Note there can be several other sets of security processing nodes 150 each designed to apply specific security to a certain type of traffic flow 142. There can also be multiple nodes 150 for a specific type of security processing task for a traffic type, such as multiple anti-virus checking nodes, in order to distribute processing load for a specific security processing task on a specific traffic type under heavy traffic load conditions.

In this example, the security provider 110 also includes a profile manager 170 to manage subscriptions to the security profiles 160 for each security customer 120. A session manager 151-1 through 151-T is also included for each segregated traffic flow 142. Generally, the session manager 151 for each traffic flow 142 manages application of security processing, as specified by each security profile 160 for each customer 120, to data packets of that traffic flow 142, as will be explained. Further details of processing in accordance with configurations disclosed herein will now be provided with reference to the flow chart of processing steps in FIG. 3.

Figure 3:
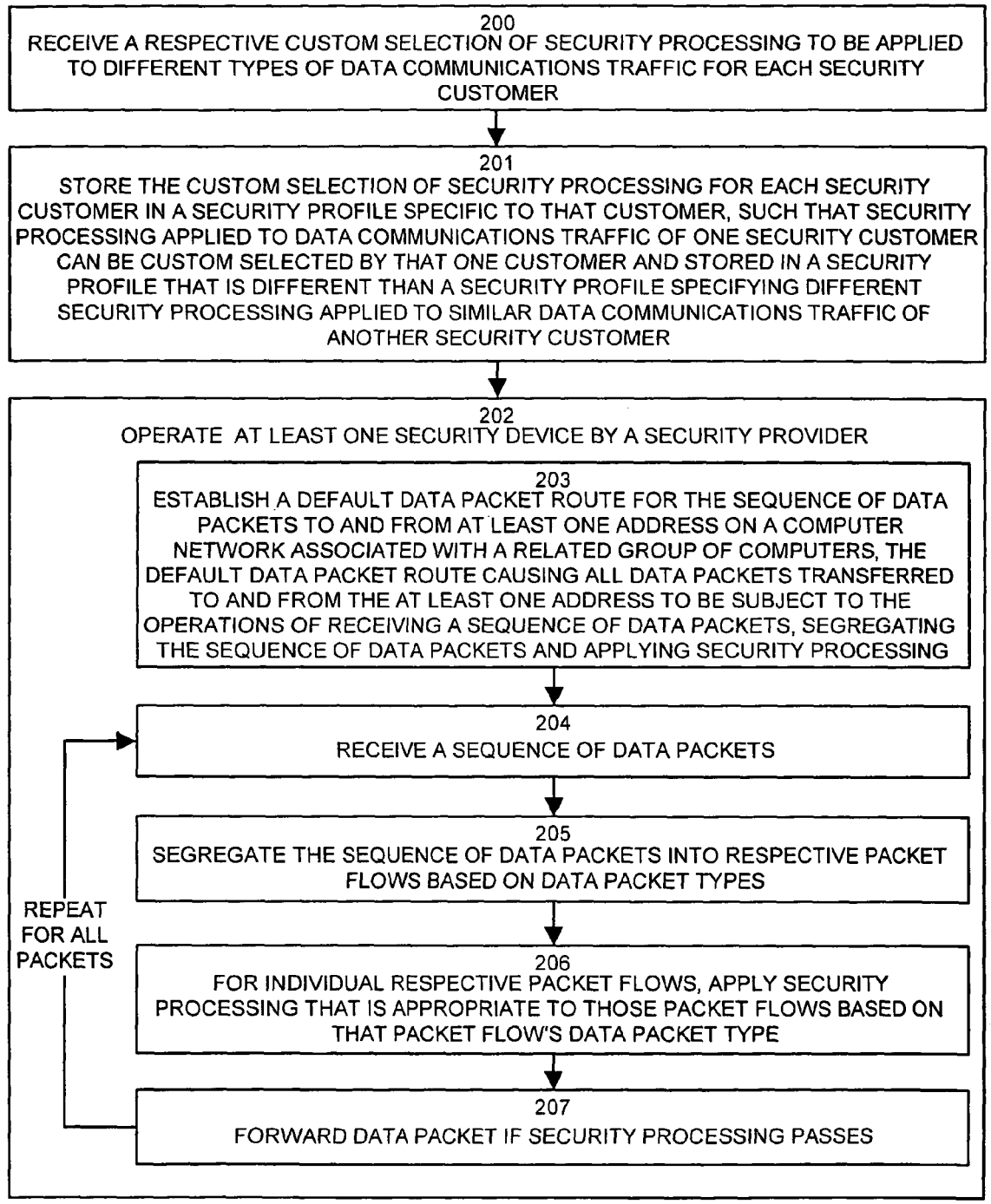
FIG. 3 is a flow chart of processing steps for providing security to security customers according to one example configuration disclosed herein.

FIG. 3 is a flow chart of high-level processing steps that the security provider 110 performs in accordance with one example embodiment of the invention.

In step 200, for each security customer 120-1 through 120-N, the security provider 110 receives a respective custom selection 125 of (e.g., subscription to) security processing services to be applied to different types of data communications traffic for that security customer 120. As an example, the profile manager 170 can provide a graphical user interface to the security customer 124 (or to a security manager 126 of the security provider 110) to allow that person to choose (e.g., via selection of checkboxes in a menu for each different traffic type) what specific types of security processing are to be applied to what specific types of data traffic for that customer.

In step 201, the security provider 110 stores the custom selection 125 of security processing for each security customer 120 in a security profile 160 specific to that customer 120, such that security processing applied to data communications traffic of one security customer can be custom selected by that one customer and stored in a security profile 160 that is different than a security profile specifying different security processing applied to similar data communications traffic of another security customer. As an example, one customer might choose to apply content leakage checking and encryption to be applied to that customer's file transfer traffic, while another customer might choose to only apply protocol verification and encryption, but not content leakage.

The profile manager 170 maintains each security profile 160 in a database (e.g., a Lightweight Directory Access Protocol (LDAP) database, relational database, or other type of database). Each security profile 160 includes the customer identity (e.g. via IP address, or IP address range), the traffic types (e.g., via TCP port number(s) corresponding to protocol(s) used to transport that traffic, or by traffic name such as electronic mail, file transfer, etc.) to which security processing is to be applied for that customer, and the specific types of security processing to be applied to each traffic type. Once the profile 160 is established with some basic customer computer system information, such as the gateway address of entrance points to that customer's network of computer systems 122 on the Internet, the security provider 110 can provide the subscribed-to-security processing.

In one configuration, the security profile 160 can include pricing information indicating costs to be charged to that customer 120 for application of the requested/subscribed-to security processing for traffic types for a certain number of users. For example, for electronic mail traffic, the customer 120 can specify a specific number of users to which certain types of electronic mail security processing is to be applied and the customer 120 can further supply, into the security profile 160, the specific user names of those users. During the entry processing via the interface 125 in FIG. 2, the profile manager can indicate a price (e.g. $3.00 per user per month for email spam control) that the security provider 110 charges the customer 120 to apply the requested electronic mail security processing to that customer's electronic mail traffic.

In this manner, the profile manager 170 can provide a shopping cart-like experience for the customer 120 and can allow the customer to add or remove specific types of security processing for different types of traffic for that customer via a graphical user interface. The profile manager 170 can recalculate the price for each type of processing to be applied to each type of traffic as processing is added or removed from the profile 160. Once the customer is finished, to collective set of security services to be applied by the security provider 110 to the various selected traffic types for that customer 120 will have a total associated cost. This cost can be, for example, the monthly subscription rate that the security customer 120 pays to the security provider 110 to provide the security processing explained herein. Once the security profile 160 is complete, the security provider 110 can provide security services to traffic for that customer as described in the remaining steps in FIG. 3. Changes to the security profile 160 can cause the profile manager 170 to push the new profile 160 for that customer to each session manager 151 to allow those changes to be implemented immediately so that subscription changes to security processing can occur in real time.

In step 202, the security provider 110 operates at least one security device to provide security processing on behalf of customer data communications traffic 141 in accordance with each customers security profile 160. Depending upon the configuration, security provider 110 can implement the security processing architecture illustrated in FIG. 2 in one or more computerized and/or data communications devices. As an example, the security provider 110 can comprise a facility that includes multiple data communications devices such as Layer 4 content routers and/or switches that classify and route data traffic to a plurality of server computer systems that implement the processing nodes 150 described herein. In an alternative configuration, the entire processing illustrated in FIG. 2 can be performed within one or more individual computer systems programmed with software to carry out the traffic segregation and security processing. Further details of the specific device configurations and system architecture will be provided in conjunction with the more detail explanations of processing described below. Sub-steps 203 through 207 provide some high level details of this processing in accordance with example embodiments.

In step 203, the security provider 110 establishes a default data packet route 115 for the sequence of data packets to and from at least one address on a computer network associated with a related group of computers, such as the customer computer systems 122. The network 101 can route all data packets transported to or from each security customer computer system 122 through the security provider facility 110 within the network 101. This is because the security provider 110 establishes the default route 115 for such data packets (i.e. route 115 serves as the path for all packets to or from the destination addresses of paths 116-1 through 116-N to each security customer 120) to force such packets 141 to arrive at the security provider 115 before entering or exiting the customer facility 120. In one configuration, the individual customer data paths 116 provide respective virtual private networks (VPN) between the security provider 110 and each of the security customers 120. In one configuration, the related group of customer computers 122 is a second network of computer systems, such as a local area network, accessible on the first network 101 (i.e. the Internet) using the address to which the default route 115 is set. This data routing architecture ensures that all traffic transmitted to or from security customer computer systems 122 can be subject to the security processing applied within the security provider 110 so that no traffic can bypass the security provider unless authorized to do so.

In step 204, the security provider 110 receives a sequence of data packets 141. The sequence of data packets 141 represents all customer traffic that has been routed to the security provider 110 via the default route 115.

In step 205, the security provider 110 segregates the sequence of data packets 141 into respective packet flows 142-1 through 142-Z based on data packet types. The traffic classifier 140 that performs this segregation in FIG. 2 may be a content networking data communications device such as a Layer 4 networking switch or router that analyzes the content of individual packets to determine characteristics/content of those packets to make routing decisions. In FIG. 2, the traffic classifier 140 routes electronic mail traffic to route 142-1, file transfer traffic to route 142-2, web traffic to route 142-3, XML traffic to route 142-4, and so forth. Note that some customers 120 may chose to have no security applied to certain types of traffic, in which case the traffic classifier 140 routes those types of traffic to a bypass route 144 which causes the traffic to not be routed through any security processing nodes 150.

Next, in step 206, for individual respective packet flows 142, the security provider 110 applies security processing 150 that is appropriate to those packet flows 142 based on that packet flow's data packet type. In one configuration, the session manager 151 manages each flow 142 for application of proper security processing in each node 150 to traffic of that flow 142. To do so, the session manager 151 routes the data packets for its traffic flow 142 to specific security processing nodes 150 that apply specific security processing for that type of traffic. If a security profile 160 for one customer specifies robust security processing for a specific type of traffic such as electronic mail traffic, that the session manager routes electronic mail data packets for that customer 120 that for that flow 142-1 to each node 150 that applies the subscribed-to security processing specific to electronic mail.

As an example of specific nodes 150 within a set of processing nodes 150, the set of electronic mail security processing nodes 150-1 includes nodes 150-1A through 150-1G that apply security processing specific to electronic mail security. Specifically, the set of electronic mail processing nodes 150-1 include a virus processing node 150-1A to apply virus checking to electronic mail, a spam processing node 150-1B to check electronic mail for spam (unwanted or unsolicited electronic mail), a user validation processing node 150-1C to check validity of sender or recipient username within electronic mails, a black hole validation processing node 150-1D to identify known bad electronic mail address, a file extension/name processing node 150-1E to allow or deny electronic mail containing certain attachments, a content leakage processing node 150-1F to detect transmission of content within electronic mail that might be restricted, and an encryption processing node 150-1G to perform encryption or decryption of electronic mail messages. It is to be understood that these example nodes 150 are shown by way of example only and the invention is not limited to use of these specific nodes for electronic mail or other types of traffic processing and that more or less nodes could be used. It is also to be understood that each node can be a separate computer system such as a blade server, or each node 150 can be a software process in a single computer system, or in multiple computer systems.

Traffic 142 for different customers 120 can be distinguished using content analysis techniques, such as comparison of source and/or destination Internet Protocol (IP) addresses. For example, upon recognizing an electronic mail message for one customer 120, the session manager 151 can obtain the profile 160 for that customer in order to determine what specific electronic mail security processing is to be applied to that electronic mail message. For an electronic mail message for a different customer, the session manager 151 can obtain the security profile for that customer to determine appropriate security policy.

As packets are subject to security processing at each node 150, if a node 150 detects a problem with that packet that causes it to fail security testing in that node, the packet can either be dropped, logged, forwarded to a quarantine area, or another appropriate action can be applied. The collective set of nodes 150 to which a packet is subject to security processing operate as a filter to remove packets that do not pass the security testing of each node.

In step 207, the security provider 110 forwards data packets to their destination address if security processing applied to those packets passes at each node 150.

In general, the architecture shown in FIG. 2 and as explained above provides a unique subscription-based security processing system. Using the traffic classifier 140, the system is able to identify specific sequences of data packets 142 associated with each security customer 120 as those data packets 141 arrive at the security provider 110. The traffic classifier 140 determines, based on information within each packet, if that customer has subscribed to any security processing services of the security provider 110 for that packet.

If so, the traffic classifier 140 segregates each packet in the sequence of data packets 141 into respective packet flows 142-1 through 142-Z based on data packet types, such as electronic mail traffic 142-1, file transfer traffic 142-3, World Wide Web traffic 142-3, XML traffic 142-4, third party application traffic, and so forth. Thereafter, for individual respective packet flows 142, a series of one or more security processing nodes 150 specific to each type of packet flow 142 apply security processing that is appropriate to those packet flows 142 based on that packet flow's data packet classification or type. In this manner, the security provider 110 divides the traffic 141 to and from customers 120 based on traffic type and applies security processing specific to that traffic type. For each traffic type, customers 120 can subscribe to varying levels of security for each traffic type. This allows significantly enhanced security processing services since the traffic is segregated based on traffic type, and further allows individual customers to selectively choose what security services are applied to what types of traffic for that customer.

Figure 4:
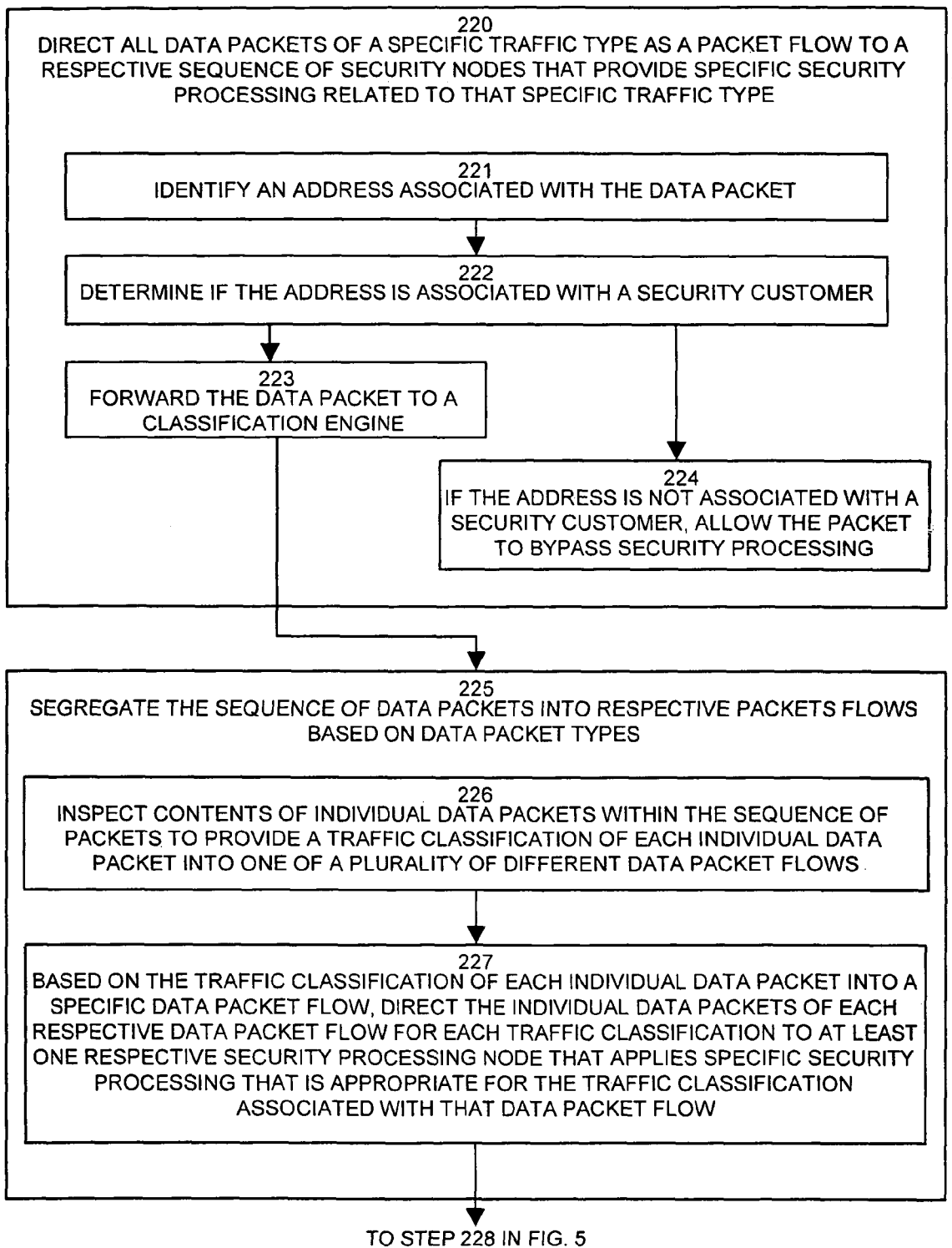
FIGS. 4 through 6 are a flow chart of processing steps showing various details of traffic segregation and application of security processing by a security provider in accordance with example embodiments of the invention.
Figure 5:
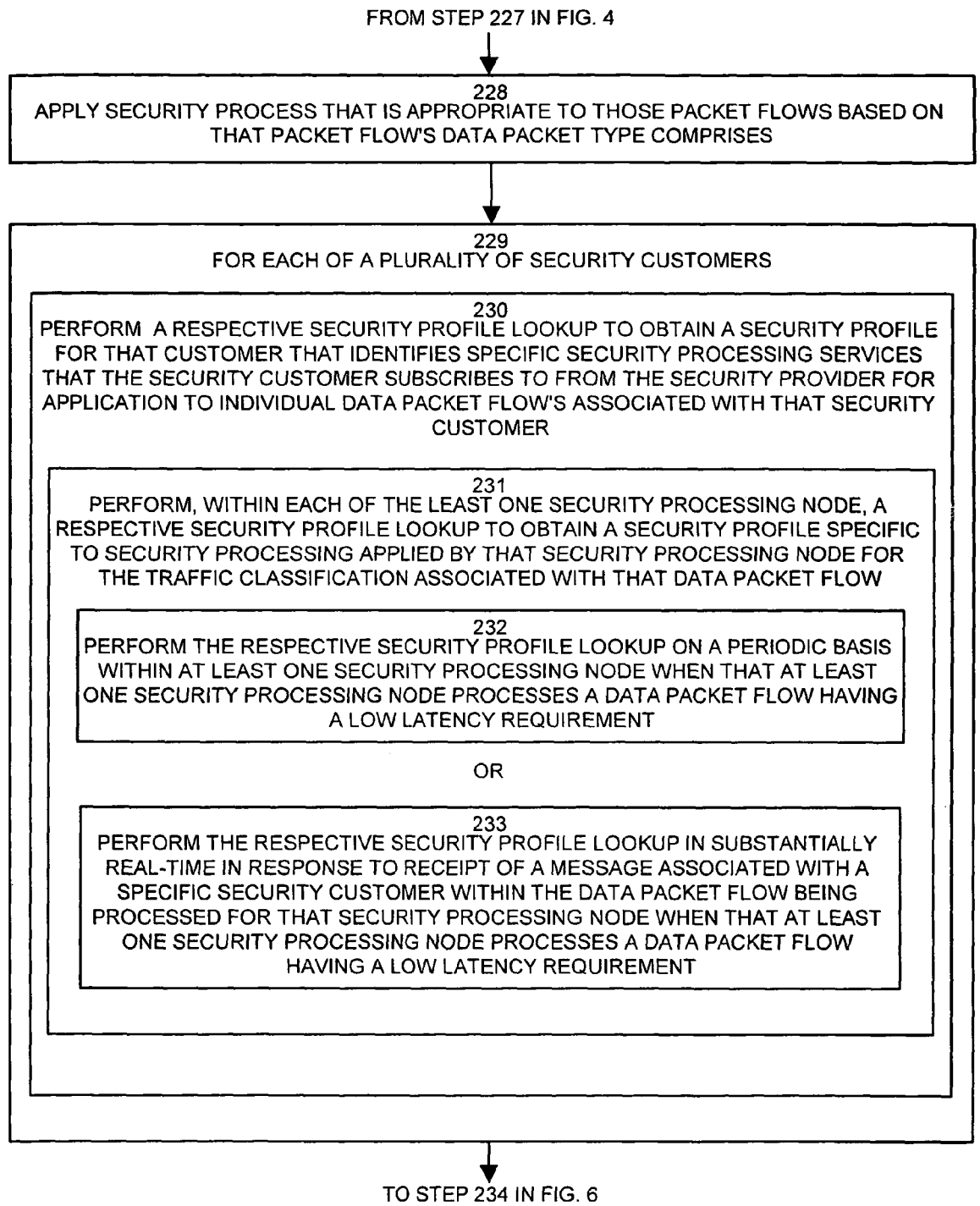
Figure 6:
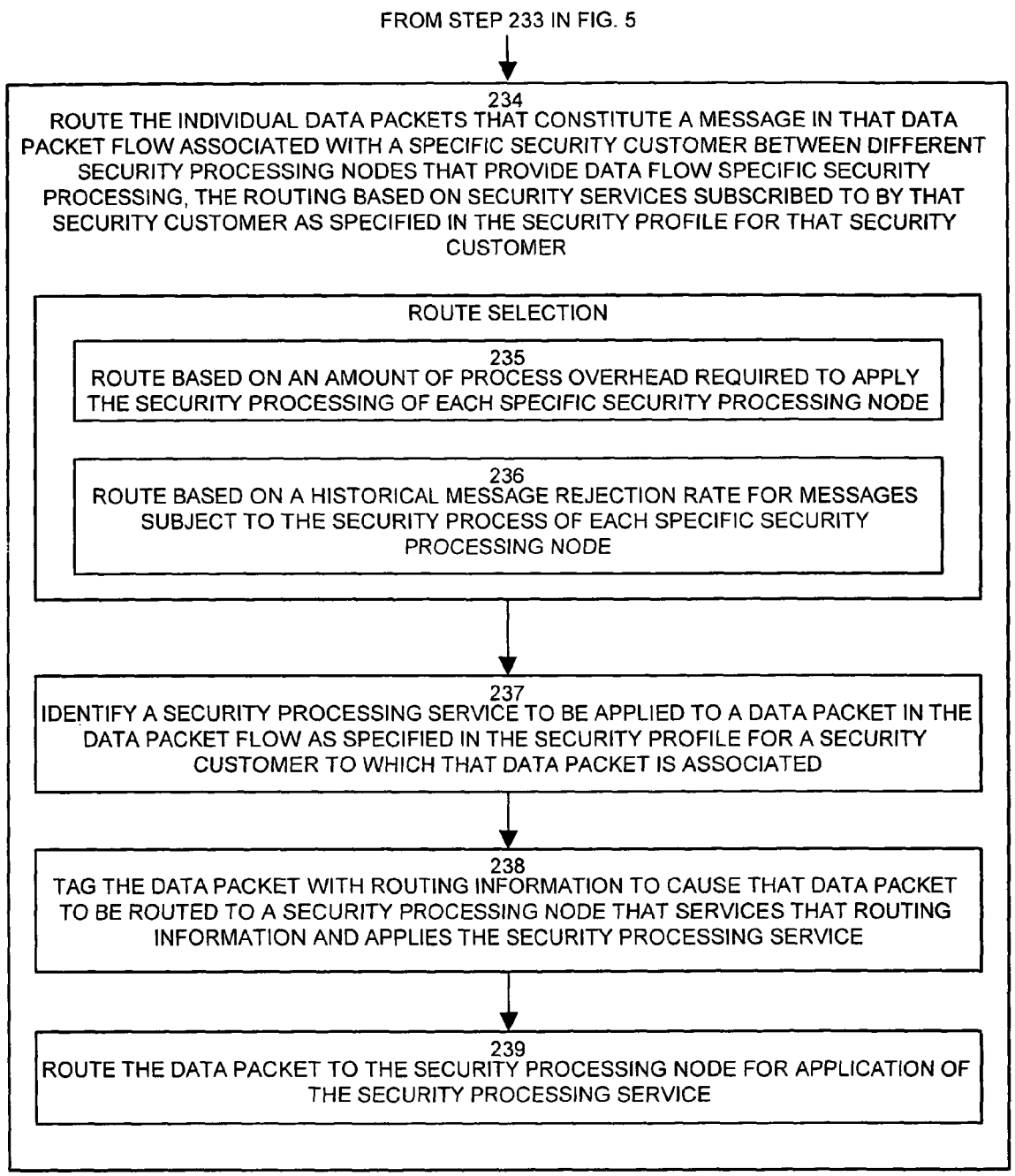

FIGS. 4, 5 and 6 are a flow chart showing details of the aforementioned processing in accordance with other example embodiments of the invention. The discussion of processing steps in this flow chart will reference FIGS. 1 and 2 as needed. The processing in FIG. 4 begins when the traffic classifier 140 begins receipt of traffic for customers 120 due to the establishment of the default route 115 for customer traffic 141 to enter the security provider 110.

In step 220, the security provider 110 directs all data packets of a specific traffic type as a packet flow 142 to a respective sequences of security nodes 150-1 through 150-Y that provide specific security processing related to that specific traffic type. Sub-steps 221 through 224 show details of this processing for example configurations.

In step 221, the security provider 110 can use a content routing device 139 to identify an address associated with the data packet arriving in the sequence 141. The content routing device can be a gateway device 139 that initially receives the default-routed sequence of packets 141 to determine if security processing is to be applied. The identified address of the packet can be a destination address if the packet is being sent from a remote computer 130 to a customer computer 122, or a source address if the packet is being sent from a customer computer 122 to a remote computer 130. One purpose of identifying the address is to determine to which customer 120, if any, the packet is associated. In an alternative configuration, packets being sent from a customer can arrive on a customer-specific VPN and thus the customer identity can be determined by the VPN address or tunnel identity.

In step 222, the security provider 110 determines if the address is associated with a security customer 120-1 through 120-N. Some traffic might be for a customer 120 that has temporarily disabled security processing, or may be for no customer at all, in which case such traffic can bypass security processing on bypass path 143.

In step 223, if the address is associated with a security customer 120-1 through 120-N, the security provider 110 forwards the data packet(s) 141 to a traffic classifier 140 to perform the operation of segregating the sequence of data packets 141 into respective packet flows 142-1 through 142-Z.

In step 224, if the address is not associated with a security customer 120, the security provider 110 allows the packet to bypass 143 the operations of segregating the sequence of data packets and applying security processing.

Next, in step 225, the security provider 110 segregates the sequence of data packets 141 into respective packets flows 142 based on data packet types. Sub-steps 226 and 227 show details of this processing for an example configuration.

In step 226, the security provider 110 inspects contents of individual data packets within the sequence of packets 141 to provide a traffic classification of each individual data packet into one of a plurality of different data packet flows 142-1 through 142-Z. The traffic classifier 140 can thus identify electronic mail traffic, web traffic, file transfer traffic, third party application traffic, and so forth.

In step 227, based on the traffic classification of each individual data packet into a specific data packet flow, the security provider 110 directs the individual data packets of each respective data packet flows 142-1 through 142-(Z-1) for each traffic classification to at least one respective security processing node 150 that applies specific security processing that is appropriate for the traffic classification associated with that data packet flow 142. The flow chart of processing steps continues at that top of FIG. 5 and shows processing details once a data packet flow is routed to the appropriate group of processing nodes.

FIG. 5 is a continuation of the flow chart from FIG. 4.

In step 228 at the top of FIG. 5, the security provider 110 applies security processing that is appropriate to those packet flows 142 based on that packet flow's data packet type. Sub-steps 229 through 233 show details of this processing for example configurations. In step 229, the security provider 110 performs a processing loop for each of a plurality of security customers 120-1 through 120-N. Sub-steps 230 through 233 are performed within this loop.

In step 230, the security provider 110 performs a respective security profile lookup 157 to obtain a security profile 160 for that customer 120. As previously discussed, the security profile 160 identifies specific security processing services that the security customer 120 subscribes to from the security provider 110 for application to individual data packet flows 142 associated with that security customer 120. Steps 231 and 232 and/or 233 show details of security profile lookup processing.

In step 231, the security provider 110 performs, within each of the least one security processing node 150 (e.g. by the session manager 151), a respective security profile lookup 157 to obtain a security profile 160 specific to security processing applied by security processing nodes for the traffic classification associated with that data packet flow 142.

In step 232, the security provider 110 performs the respective security profile lookup 157 on a periodic basis within the security processing node when that security processing node processes a data packet flow 142 having a low latency requirement.

In step 233, the security provider 110 performs the respective security profile lookup in substantially real-time in response to receipt of a message associated with a specific security customer within the data packet flow being processed for that security processing node when that security processing node processes a data packet flow 142 having a low latency requirement.

In this manner, for protocols that are amenable to high packet latency, such as electronic mail where some latency in packet transmission is allowed, the security provider 110 can perform the profile lookup 157 for each customer 120 in real-time in response to detecting an electronic mail 142 for that customer 120. For other protocols with lower latency requirements, such as those used for transport of World Wide Web traffic (Hypertext Transport Protocol—HTTP), the security provider 110 performs a security profile lookup 157 for each customer 120 on a periodic basis, such as every fifteen minutes, hourly, daily, or at some other interval (e.g., in response to detecting a change to the profile 160 for a customer) and the session manager 151 can maintain a table for fast lookup of security profile information when processing World Wide Web packets or other low latency requirement packets. The flow chart of processing steps continues at that top of FIG. 6 and shows processing details once a data packet flow is routed to the appropriate group of processing nodes.

In one configuration, a security customer can specify different security policy information 160 for inbound packets being sent to that customer 120 from a remote compute 130, and for outbound packets being sent from that customer 120 to a remote computer 130.

FIG. 6 is a continuation of the flow chart from FIG. 5.

In step 234, the security provider 110 routes the individual data packets that constitute a message in that data packet flow 142 associated with a specific security customer 120 between different security processing nodes 150 that provide data flow specific security processing. The routing is based on security services subscribed to by that security customer 120 as specified in the security profile 160 for that security customer. Steps 235 and 236 show alternative configurations that can determine in what order to route the packets between a plurality of security processing nodes 150 to apply flow specific security processing.

In step 235, the security provider 110 routes the packets based on an amount of processing overhead required to apply the security processing of each specific security processing node 150. Thus security processing can be applied based on either high to low or low to high amounts of processing bandwidth required to apply the different types of traffic specific security processing.

Alternatively, in step 236, the security provider 110 routes the packets based on a historical message rejection rate for messages subject to the security processes of each specific security processing node 150. Thus security processing can be based on historical message or packet rejection rates for each type of testing, and the system can apply tests in an order, from either high to low, or low to high rejection rates for the different types of traffic specific security processing tests selected. By applying testing that typically rejects packets at a higher rate than other tests, the other tests will not consume processing cycles unless needed.

To apply each test, in step 237, the security provider 110 identifies a security processing service (i.e., specific test for that data traffic) to be applied to a data packet in the data packet flow as specified in the security profile 160 for a security customer 120 to which that data packet is associated.

In step 238, the security provider 110 tags the data packet with routing information to cause that data packet to be routed to a security processing node 150 that services that routing information and applies the specific security processing service associated with testing corresponding to that tag. Thus, each node can implement one type of testing and can have a route associated with that node. The route can be, for example, a specific custom selected TCP port and each time a node completes processing, the session manager 151 can set the TCP port for that packet to a next TCP port number corresponding to the next node that performs the next type of security testing on that traffic type as specified in the security profile for the customer to which that packet/traffic corresponds. Upon passing the test in the last node, the last node can replace the TCP port number used for routing purposes with the original TCP port number corresponding to the type of traffic being processed by that set of nodes 150. In this manner, packets are routed using TCP port number designations.

Next, in step 239, the security provider 110 routes the data packet to the security processing node 150 for application of the security processing service. In one configuration, the session manager applies the tag and routes each packet between security processing nodes 150.

Various types of packet testing can be applied in respective nodes. Email testing has been explained above. Examples of World Wide Web traffic processing services available for subscription by a security customer and for application by respective security processing nodes 150-2 include file transfer security processing such as command filtering 150-2A, protocol verification 150-2B, content filter 150-2C and other such security processing. For World Wide Web traffic, the nodes 150-3 can apply virus checking 150-3A, content filtering, uniform resource locator information domain name validation 150-3C, World Wide Web protocol validation 150-3D, and other such processing. XML processing can include schema validation 150-TA, content filtering or verification 150-TB, signature validation or addition 150-TC and any other type of network based XML processing.

When each node 150 has finished processing the packet by applying security processing of that node, the packet will either pass or fail the security processing of that node.

In step 240, if the packet does not fail security processing in that node, the node 150 routes the packet to the next node via the session manager 151 that tracks what security processing to be applied to each packet. The node can either query the session manager 151 for the next node and route the packet to that node itself, or the node that completes testing of a packet that passes can forward the packet back to the session manager for tagging with the identity of the next node 150 (if any other test remain to be performed on that packet). Alternatively, the full profile information that indicates what tests the packet is to be subjected to can be transmitted to each node 150 by the session manager so that each node that performs testing of that packet will know what the sequence of testing is, and will therefore know what node to transport the packet to next. In any of these configurations, the packet propagates form node to node and each node applies testing specific to that node. When the last node completes and passes testing on the packet, the packet can be routed out of the security provider 110 and on to its final destination. Note that in FIGS. 1 and 2, testing can be performed on inbound and/or outbound traffic respective to security customers. Thus, the sequence of data packets 141 represents any data communications traffic being sent to or from the security customer computer systems 122.

If the packet passes the testing of the last node to apply security processing (as determine by the security profile), the packet is forwarded to its destination. In this manner, the system is able to provide custom security processing to each packet of a certain traffic type. The flexibility of the system allows custom security policies since the system provides traffic segregation based on security relevant characteristics of that traffic. Also, the system is scalable since each node is either a separate computing device such as a server, or each node can be a software process (i.e., an image of an executable capable of performing the testing). As traffic loads increase for a particular traffic type, the system of the invention can scale by instantiating additional redundant or duplicate images of certain "popular" nodes. Thus, in one embodiment, the system is able to detect a change in traffic volume for specific traffic types (e.g. an increase in email traffic) and in response, can dynamically alter a number of operational security processing nodes to accommodate for the change in traffic volume. For example, suppose email traffic increases at a certain time of day. The system can adapt to this change dynamically in real-time by detecting a burst in email traffic, or in a scheduled manner, such as from 7-9 AM each Monday- Friday for particular customers 120. By adapting in this manner, the system can accommodate an increase in email traffic processing by running additional software images of virus and spam email testing processes (i.e., nodes 150-1A and 150-1B in FIG. 2) on additional blade server computer systems to be able to handle the additional traffic load. As this load of emails subsides either on a scheduled basis at a certain time each day, or upon the system detecting a real-time change, the email processing images can be halted and cleared from memory to free up processing resources. The system is thus able to detect an change in traffic volume and in response, can dynamically alter a number of operational security processing nodes to accommodate for the change in traffic volume.

In step 241, if a packet fails any test in any node 150, the node 150 can drop that packet, perform a logging action, and can notify a security manager of the security provider 110. The system can track statistics of what type of processing result in-failed packet tests within security processing nodes.

Figure 7:
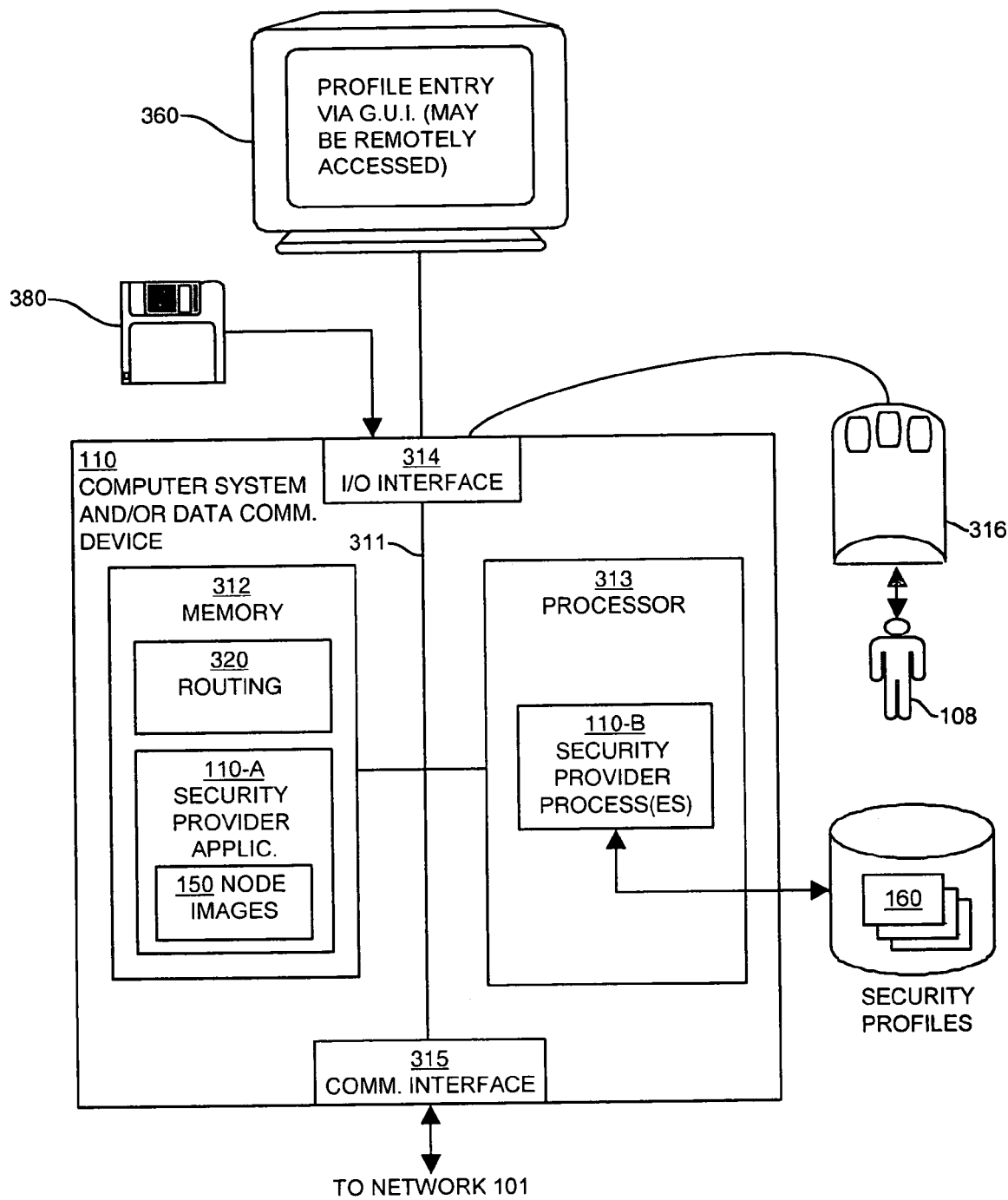
FIG. 7 is an architecture that supports detach, modify and reattach processing in accordance with the processing steps shown in FIGS. 8 and 9.

FIG. 7 illustrates an example security provider computerized device 110 such as a data communications device or computer system operating as the security provider 110. The computer system 110 executes, runs, interprets, operates or otherwise performs a security provider application 110 (application 110-A and process 110-B) that provides security to data communications traffic as disclosed herein. The computerized device 110 may be any type of computerized device or data communications device such as a router, switch, gateway, hub, computer, workstation, server or the like. As shown in this example, the computerized device 110 includes an interconnection mechanism 311 such as a data bus or other circuitry that couples a memory system 312, a processor 313, an input/output interface 314, and a communications interface 315. An input device 316 (e.g., one or more user controlled devices such as a keyboard, mouse, etc.) couples to processor 313 through I/O interface 314 and enables a user 108 such as a customer 120 or security provider administrator to provide input commands such as security profile information 160 and to generally control the computerized device 310 via the graphical user interface 360 to allow configuration of security profiles 160 and/or administration of the security provider software processes 110-B. Also in this example configuration, a database stores security profiles 160. The communications interface 315 enables the computer system 110 to communicate with other devices (i.e., other computers) on the network 101.

The memory system 312 is any type of computer readable medium and in this example is encoded the security provider application 110-A configured in accordance with embodiments explained herein. The security provider application 110-A may be embodied as software code such as data and/or logic instructions (e.g., code stored in the memory or on another computer readable medium such as a removable disk) that supports processing functionality according to different embodiments described herein. When executed on the processor 313, the security provider application 110-A forms the security provider process 110B that operates as explained herein to provide security processing to security customers 120.

Note the FIG. 7 shows a single computer operating as the security provider 110. It is to be understood that the system can be implemented in one computer, or many, and that the computer 110 can be a combination of devices, such as programmed Layer 4 switches, and servers for each node 150. The system can thus be distributed or embodied in one or many servers, data communications devices, or any combination thereof.

What is claimed is:

1. A method for applying security processing to data communications traffic, the method including operations comprising:
   receiving a sequence of data packets;
   classifying each of the data packets by data packet type;
   segregating the sequence of data packets into multiple respective packet flows based on data packet types;
   for a respective packet flow of the multiple respective packet flows, applying security processing that is appropriate to the respective packet flow based on a data packet type of data packets in the respective packet flow; and
   forwarding the data packets of the respective packet flow to a destination in response to detecting that security processing specific to the data packet type of the respective packet flow passes security testing;
the method further comprising:
   retrieving a given data packet from the sequence;
   utilizing an address in the given data packet to identify a customer to which the given data packet pertains;
   obtaining a security profile for the customer, the security profile indicating security processing to be applied to communications associated with the customer;
   identifying an original port number in the given data packet, the original port number indicating a next hop node in which to forward the given data packet;
   replacing the original port number in the given data packet with a replacement port number, the replacement port number specifying a particular processing node of multiple processing nodes in which to forward the given data packet, the particular processing node designated to provide security processing for data packets of a same type as the given data packet; and
   forwarding, based on the replacement port number, the given data packet to the particular processing node.

2. The method of claim 1 wherein receiving the sequence of data packets comprises:
   establishing a default data packet route for the sequence of data packets to and from at least one address on a computer network associated with a related group of computers, the default data packet route causing all data packets transferred to and from the at least one address to be subject to the operations of receiving a sequence of data packets, segregating the sequence of data packets, and applying security processing.

3. The method of claim 2 comprising:
   operating at least one security device by a security provider to receive the sequence of data packets via the default data packet route, the security device performing the operations of receiving a sequence of data packets, segregating the sequence of data packets and applying security processing on behalf of security customers that subscribe to security processing services provided by the at least one security device; and
   wherein the related group of computers are a second network of computer systems accessible on the first network using the at least one address and are operated by a security customer that subscribes to application of the security processing to data communications traffic transferred to and from the at least one address on the first network used to access the related group of computers.

4. The method of claim 3 wherein the first network is the Internet and wherein there are a plurality of related groups of computers, each associated with a different respective security customer, and wherein the method comprises:

receiving a respective custom selection of security processing to be applied to different types of data communications traffic for each security customer;

storing the custom selection of security processing for each security customer in a security profile specific to that customer, such that security processing applied to data communications traffic of one security customer can be custom selected by that one customer and stored in a security profile that is different than a security profile specifying different security processing applied to similar data communications traffic of another security customer.

5. The method of claim 4 wherein multiple sequences of packets are processed, each sequence containing packet flows of different traffic types for different security customers; and
wherein segregating the sequence of data packets into multiple respective packet flows based on data packet types comprises:
directing all data packets of a specific traffic type as a packet flow to a respective sequence of security nodes that provide specific security processing related to that specific traffic type; and
wherein applying security processing comprises:
for each sequence of security nodes that processing a respective packet flow, performing a respective security profile lookup to obtain a security profile for security customers associated with data packets in the data packet flow; and
applying respective security processing services to data packets in the data packet flow for specific security customers based on the security services specified in the security profile for that security customer.

6. The method of claim 1 wherein segregating the sequence of data packets into multiple respective packets flows based on data packet types comprises:
inspecting contents of individual data packets within the sequence of packets to provide a traffic classification of each individual data packet into one of a plurality of different data packet flows;
based on the traffic classification of each individual data packet into a specific data packet flow, directing the individual data packets of each respective data packet flows for each traffic classification to at least one respective security processing node that applies specific security processing that is appropriate for the traffic classification associated with that data packet flow.

7. The method of claim 6 wherein applying security processing that is appropriate to those packet flows based on that packet flow's data packet type comprises:
for each of a plurality of security customers, performing a respective security profile lookup to obtain a security profile for that customer that identifies specific security processing services that the security customer subscribes to from the security provider for application to individual data packet flows associated with that security customer.

8. The method of claim 7 wherein performing a respective security profile lookup comprises:
performing, within each of the least one security processing node, a respective security profile lookup to obtain a security profile specific to security processing applied by that security processing node for the traffic classification associated with that data packet flow.

9. The method of claim 8 wherein performing a respective security profile lookup to obtain a security profile specific to security processing applied by that security processing node comprises:

performing the respective security profile lookup on a periodic basis within at least one security processing node when that at least one security processing node processes a data packet flow having a low latency requirement.

10. The method of claim 8 wherein performing a respective security profile lookup to obtain a security profile specific to security processing applied by that security processing node comprises:
performing the respective security profile lookup in substantially real-time in response to receipt of a message associated with a specific security customer within the data packet flow being processed for that security processing node when that at least one security processing node processes a data packet flow having a low latency requirement.

11. The method of claim 7 wherein applying security processing comprises:
routing the individual data packets that constitute a message in that data packet flow associated with a specific security customer between different security processing nodes that provide data flow specific security processing, the routing based on security services subscribed to by that security customer as specified in the security profile for that security customer.

12. The method of claim 11 wherein routing the individual data packets comprises:
identifying a security processing service to be applied to a data packet in the data packet flow as specified in the security profile for a security customer to which that data packet is associated;
tagging the data packet with routing information to cause that data packet to be routed to a security processing node that services that routing information and applies the security processing service;
routing the data packet to the security processing node for application of the security processing service;
repeating the steps of identifying a security processing service, tagging the data packet with routing information and routing the data packet to the security processing node for a plurality of security processing services specified for data packets of the data packet flow in the security profile for the security customer to which that data packet is associated.

13. The method of claim 12 wherein repeating the steps of identifying a security processing service, tagging the data packet with routing information and routing the data packet to the security processing node is performed until at least one of:
i) all security processing services specified in the security profile for the data packet of the data packet flow for the security customer to which that data packet is associated have been applied; and
ii) one of the security processing services specified in the security profile for the data packet of the data packet flow for the security customer to which that data packet is associated determines that the packet fails a test of the security processing service.

14. The method of claim 11 wherein routing the individual data packets of a data packet flow that constitute a message in that data flow associated with a specific security customer between different security processing nodes comprises:
for those security services subscribed to by that security customer as specified in the security profile for that security customer, routing the data packets that constitute a message for that customer between security processing nodes in an order that is based upon at least one of:

i) an amount of processing overhead required to apply the security processing of each specific security processing node; and i) a historical message rejection rate for messages subject to the security processing of each specific security processing node.

15. The method of claim 1 comprising:

detecting a change in packet flow volume for a specific packet flow and in response, dynamically altering a number of operational security processing nodes that apply security processing for that packet flow to accommodate the change in packet flow volume.

16. The method as in claim 1, wherein segregating the sequence of data packets includes:

segregating the sequence of data packets in a switch disposed in a network, the switch analyzing contents of the data packets in the sequence to make routing decisions.

17. The method as in claim 1 further comprising:

receiving the given data packet at the particular processing node;

subsequent to applying security processing to the given data packet in accordance with a setting as specified by the security profile, replacing the replacement port number in the given data packet with the original port number; and forwarding the given data packet to the next hop node as specified by the original port number;

wherein forwarding the given data packet to the next hop node occurs in response to the given data packet passing a security test applied by the processing node.

18. A method for applying security processing to data communications traffic, the method including operations comprising:

receiving a sequence of data packets;

classifying each of the data packets by data packet type;

segregating the sequence of data packets into multiple respective packet flows based on data packet types;

for a respective packet flow of the multiple respective packet flows, applying security processing that is appropriate to the respective packet flow based on a data packet type of data packets in the respective packet flow; and forwarding the data packets of the respective packet flow to a destination in response to detecting that security processing specific to the data packet type of the respective packet flow passes security testing;

wherein segregating the sequence of data packets into multiple respective packet flows based on data packet types comprises:

detecting that at least one data packet in the sequence of data packets is an electronic mail message and in response, directing the electronic mail message to a session manager for application of electronic mail security processing techniques provided by a sequence of electronic mail-specific security processing nodes; and wherein applying security processing comprises:

obtaining a security profile associated with a security customer to which the electronic mail message is associated, the security profile identifying subscribed-to electronic mail security processing services for that security customer;

routing individual electronic mail messages through a sequence of security processing nodes that each provide specific electronic mail security processing services, the selection of security processing nodes in the sequence determined by the security services subscribed to by the security customer associated with each electronic mail message as specified in the security profile for that security customer, the electronic mail security processing services available for subscription by a security customer and for application by respective security processing nodes including:

i) virus checking;

ii) electronic mail spam filtering;

iii) user validation of at least one on of a sender and a recipient of an electronic mail message associated with the security customer;

iv) black hole validation;

v) content leakage detection to detect unauthorized transmission of content to and from the security customer within electronic mail; and vi) electronic mail encryption and decryption operations.

19. A method for applying security processing to data communications traffic, the method including operations comprising:

receiving a sequence of data packets;

classifying each of the data packets by data packet type;

segregating the sequence of data packets into multiple respective packet flows based on data packet types;

for a respective packet flow of the multiple respective packet flows, applying security processing that is appropriate to the respective packet flow based on a data packet type of data packets in the respective packet flow;

forwarding the data packets of the respective packet flow to a destination in response to detecting that security processing specific to the data packet type of the respective packet flow passes security testing; and wherein segregating the sequence of data packets into multiple respective packet flows based on data packet types comprises:

detecting that at least one data packet in the sequence of data packets includes World Wide Web traffic and in response, directing the World Wide Web traffic to a session manager for application of World Wide Web traffic security processing techniques provided by a sequence of World Wide Web traffic-specific security processing nodes; and wherein applying security processing comprises:

obtaining a security profile associated with a security customer to which the World Wide Web traffic is associated, the security profile identifying subscribed-to World Wide Web traffic security processing services for that security customer;

populating a security matrix indicating security processing nodes to be applied based on characteristics of the World Wide Web traffic specific to that customer, the security matrix allowing rapid invocation of specific security processing nodes upon the World Wide Web traffic without requiring a security profile lookup for that security customer for each portion of World Wide Web traffic received;

identifying the World Wide Web traffic to a sequence of security processing nodes that each provide specific World Wide Web traffic security processing services, the selection of security processing nodes in the sequence determined by the security services subscribed to by the security customer associated with each electronic mail message, World Wide Web traffic processing services available for subscription by a security customer and for application by respective security processing nodes including:

i) virus checking;
ii) content filtering;
iii) uniform resource locator information validation; and
iv) World Wide Web protocol validation.

20. A method for applying security processing to data communications traffic, the method including operations comprising:
receiving a sequence of data packets;
classifying each of the data packets by data packet type;
segregating the sequence of data packets into multiple respective packet flows based on data packet types;
for a respective packet flow of the multiple respective packet flows, at a processing node in a network, applying security processing that is appropriate to the respective packet flow based on a data packet type of data packets in the respective packet flow; and
forwarding the data packets of the respective packet flow to a destination in response to detecting that security processing specific to the data packet type of the respective packet flow passes security testing; the method further comprising:
storing a security profile for each of multiple customers;
receiving a first data packet;
receiving a second data packet;
in response to identifying that the first data packet is of a first data packet type, storing the first data packet in a first packet flow;
in response to identifying that the second data packet is of a second data packet type, storing the second data packet in a second packet flow;
based on an address associated with the first data packet, identifying that the first data packet is associated with a first customer;
obtaining a first security profile, the first security profile indicating security processing to be applied to communications associated with the first customer;
applying security processing to the first data packet in accordance with the first security profile;
based on an address associated with the second data packet, identifying that the second data packet is associated with a second customer;
obtaining a second security profile, the second security profile indicating security processing to be applied to communications associated with the second customer; and
applying security processing to the second data packet in accordance with the second security profile.

21. A method for applying security processing to data communications traffic, the method including operations comprising:
receiving a sequence of data packets;
classifying each of the data packets by data packet type;
segregating the sequence of data packets into multiple respective packet flows based on data packet types;
for a respective packet flow of the multiple respective packet flows, applying security processing that is appropriate to the respective packet flow based on a data packet type of data packets in the respective packet flow;
forwarding the data packets of the respective packet flow to a destination in response to detecting that security processing specific to the data packet type of the respective packet flow passes security testing; the method further comprising:
retrieving a given data packet from the sequence;
utilizing an address in the given data packet to identify a customer to which the given data packet pertains;
obtaining a security profile for the customer, the security profile indicating multiple different types of security processing to be applied to communications associated with the customer;
identifying an original port number in the given data packet, the original port number indicating a next hop node in which to forward the given data packet towards a destination node to which the given data packet is being transmitted;
replacing the original port number in the given data packet with a first replacement port number, the first replacement port number specifying a first processing node of multiple processing nodes in which to forward and test the given data packet, the first processing node designated to apply a first type of security processing to the given data packet;
forwarding the given data packet to the first processing node based on the first replacement port number in the given data packet;
subsequent to applying the first type of security processing to the given data packet at the first processing node, replacing the first replacement port number in the given data packet with a second replacement port number, the second processing node designated to apply a second type of security processing to the given data packet;
forwarding the given data packet to the second processing node based on the second replacement port number in the given data packet;
subsequent to applying the second type of security processing to the given data packet at the second processing node, replacing the second replacement port number in the given data packet with the original port number; and
forwarding the given data packet from the second processing node to the next hop node towards the destination node as specified by the original port number.

22. A method for applying security processing to data communications traffic, the method including operations comprising:
receiving a sequence of data packets;
classifying each of the data packets by data packet type;
segregating the sequence of data packets into multiple respective packet flows based on data packet types;
for a respective packet flow of the multiple respective packet flows, applying security processing that is appropriate to the respective packet flow based on a data packet type of data packets in the respective packet flow;
forwarding the data packets of the respective packet flow to a destination in response to detecting that security processing specific to the data packet type of the respective packet flow passes security testing;
receiving custom security information from each of multiple customers;
utilizing the custom security information to create multiple customer profiles, the multiple customer profiles specifying types of security testing to be applied to different types communications transmitted in a network for the multiple customers;
storing the customer profiles, each respective customer profile specifying how to test different types of data packets;
wherein classifying each of the data packets by data packet type includes classifying a group of data packets in the sequence as being of a particular data packet type, the method further comprising:
applying a first security test to a first data packet in the group in accordance with a first customer profile of the multiple customer profiles; and applying a second security test to a second data packet in the group in accordance with a second customer profile of the multiple customer profiles.

23. The method as in claim 22, wherein applying the first security test includes modifying routing information in the first data packet to forward the first data packet to a first processing node, the first processing node configured to apply the first security test to verify the first data packet;

wherein applying the second security test includes modifying routing information in the second data packet to forward the second data packet to a second processing node, the second processing node configured to apply the second security test to verify the second data packet;

wherein receiving the sequence of data packets includes receiving a first data packet and a second data packet, the method further comprising:

modifying routing information in the first data packet to forward the first data packet to a first processing node, the first processing node applying a first security test to verify the first data packet; and modifying routing information in the second data packet to forward the second data packet to a second processing node, the second processing node applying a second security test to verify the second data packet.

* * * * *